US011029968B1

(12) United States Patent
Klee et al.

(10) Patent No.: US 11,029,968 B1
(45) Date of Patent: Jun. 8, 2021

(54) OPERATING SYSTEM WITH A SINGLE KERNEL STACK PER PROCESSOR

(71) Applicant: Facebook Technologies, LLC, Menlo Park, CA (US)

(72) Inventors: Christoph Klee, Snoqualmie, WA (US); Bernhard Poess, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 118 days.

(21) Appl. No.: 16/528,221

(22) Filed: Jul. 31, 2019

(51) Int. Cl.
*G06F 9/00* (2006.01)
*G06F 15/177* (2006.01)
*G06F 9/4401* (2018.01)
*G06F 9/50* (2006.01)

(52) U.S. Cl.
CPC .......... *G06F 9/4406* (2013.01); *G06F 9/5027* (2013.01)

(58) Field of Classification Search
CPC .................................................. G06F 9/4406
See application file for complete search history.

(56) References Cited

U.S. PATENT DOCUMENTS

| | | | | |
|---|---|---|---|---|
| 7,360,213 B1* | 4/2008 | Altieri | ................... | G06F 9/4812 718/100 |
| 7,676,508 B2* | 3/2010 | Robert | ................ | G06F 11/3688 707/999.204 |
| 8,271,996 B1* | 9/2012 | Gould | ..................... | G06F 9/542 719/312 |
| 8,276,145 B2* | 9/2012 | Papaefstathiou | ....... | G06F 9/485 718/102 |
| 8,473,964 B2* | 6/2013 | Jayamohan | ............... | G06F 9/54 719/310 |
| 9,086,906 B2* | 7/2015 | Patel | ..................... | G06F 9/4555 |
| 10,459,851 B2* | 10/2019 | Krten | .................... | G06F 9/4552 |
| 2008/0127142 A1* | 5/2008 | Wrighton | .................. | G06F 9/52 717/148 |

\* cited by examiner

*Primary Examiner* — Mohammed H Rehman
(74) *Attorney, Agent, or Firm* — Baker Botts L.L.P.

(57) ABSTRACT

In one embodiment, a method includes storing thread state information associated with the first user-mode thread into a memory space associated with the first user-mode thread when executing in kernel space in response to a first system call by a first-user mode thread, executing first operations corresponding to the first system call on a processor, where data associated with executing the first operations are stored on a kernel stack associated with the processor, determining to pause the execution of the first operations, enqueuing a workload on a schedule queue for resuming execution of the first operations in a future, where the workload comprises data associated with executing a remainder of the first operations, and executing second operations corresponding to a second system call from a second user-mode thread on the processor, where data associated with executing the second operations are stored on the kernel stack associated with the processor.

20 Claims, 6 Drawing Sheets

```
void workload_func_x(void* func_data)
{
    int i;
    struct x_data* data = func_data;
    // Start processing data from where we left off.
    for (i = data->start; i < data->end; i++)
    {
        // Do something
        do_something(data, i);
        if (sched_need_resched()) // Check whether need to pause
        {
            // Set from where to resume the remaining work
            data->start = i;
            sched_enqueue_workload(workload_func_x, data);
            return;
        }
    }
    /*
     * All done with the workload, don't enqueue context back
     * into the scheduler.
     */
    return;
}
```

*FIG. 3A*

```
scheduler_loop(void)
{
    while (true)
    {
        work_item = get_work_item_for_current_cpu();
        work_item->func(work_item->data); // This would be
equivalent to a call to workload_func_x(data);
    }
}
```

OPERATING SYSTEM WITH A SINGLE KERNEL STACK PER PROCESSOR

TECHNICAL FIELD

This disclosure generally relates to an operating system of computing devices, and in particular, related to implementing a system kernel.

BACKGROUND

An operating system is system software that manages computer hardware and software resources and provides common services for computer processes. A kernel may be a core part of an operating system. The kernel may be one of the first programs loaded on start-up (after the bootloader). The kernel may handle the rest of start-up as well as input/output requests from processes, translating the requests into data-processing instructions for the central processing unit. The critical code of the kernel may be loaded into a separate area of memory, which may be protected from access by application processes or other, less critical parts of the operating system. The kernel may perform its tasks, such as running processes, managing hardware devices, and handling interrupts, in this protected kernel space. A user-mode process may make a request to the kernel by calling a system call. A monolithic kernel may be a single large process running entirely in a single address space. All kernel services may exist and execute in the kernel address space. In microkernels, the functionality provided by a monolithic kernel may be broken down into separate processes, known as service-providing processes, or servers. A subset of the service-providing processes may run in kernel space and the rest may run in user-space. All service-providing processes may be kept separate and run in different address spaces. A thread may be a component of a process. Multiple threads may exist within one process, executing concurrently and sharing resources such as memory, while different processes do not necessarily share these resources. A user-mode thread may make a request to the kernel by calling a system call. A number of models have been introduced. In a 1-to-1 model, a user-mode thread may have a 1-to-1 corresponding kernel-mode thread that handles requests from the user-mode thread. An N-to-1 model may imply that all user-mode threads map to one kernel-mode thread. The kernel may have no knowledge of the user-mode threads. With the N-to-1 model, context switching may be done very quickly. However, a legacy N-to-1 kernel may block whole process if one of the user-mode threads needs to execute a blocking Input/Output request.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a kernel of a microkernel-based operating system may process system calls from a plurality of user-mode threads without maintaining in-kernel thread state for user-mode threads. The kernel may process a system call from a user-mode thread in a way such that the system call returns with results of operations without a need to block. In particular embodiments, the kernel may process the system call such that the system call returns with an event identifier, which will be used to inform the calling user-mode thread that the operation has been completed through an asynchronous completion mechanism such as communicating results using one of one or more available Inter-Process Communication (IPC) mechanisms at a later point in time. In particular embodiments, a system call may be blocking. For example, a system call that explicitly waits for one or more events related to one or more waitable objects. With the invention disclosed in this application, a microkernel-based computing device may not need to maintain a kernel stack per user-mode thread that containing in-kernel thread state. Having a kernel stack per each user-mode thread may downgrade the performance of the system because that may decrease a chance of cache hit when context switches between threads occur frequently. In particular embodiments, the microkernel-based computing device may maintain a kernel stack per core, which results in a better cache locality. A power consumption may also be reduced thanks to the better cache locality.

In particular embodiments, an operating system of a computing device may be a microkernel-based operating system. User-mode threads in the operating system may comprise user application threads and service-providing threads. A first service-providing thread may provide a particular service to second threads. A service-providing thread may be a device driver. An application thread may be implemented with an event-driven architecture. The second threads may comprise other service-providing threads or user application threads. A request for the particular service from one of the second threads to the first service-providing thread may be communicated through one of available IPC mechanisms. A result of the particular service from the first service-providing thread to one of the second threads may be communicated through one of the available IPC mechanisms. The computing device may comprise one or more processors. Each processor may be associated with only one kernel-mode thread. The kernel-mode thread may be associated with a kernel stack. A kernel-mode thread of the operating system may store thread state information associated with a first user-mode thread into a memory space accessible to the first user-mode thread when executing in kernel space in response to a first system call by the first-user mode thread. The thread state information associated with the first user-mode thread may be a snapshot of register values associated with the processor when the first user-mode thread calls the first system call. In particular embodiments, the memory space accessible to the first user-mode thread may be a Thread-Local Storage (TLS) associated with the first user-mode thread. In particular embodiments, the memory space accessible to the first user-mode thread may be a Thread Control Block (TCB) associated with the first user-mode thread. The kernel-mode thread may execute first operations corresponding to the first system call on a processor of the computing device. Data associated with executing the first operations may be stored on a kernel stack associated with the processor. The kernel-mode thread may determine to pause the execution of the first operations by calling a scheduler function that makes a schedule decision among a plurality of workloads in the schedule queue based on one or more scheduling policies. The kernel-mode thread may enqueue a workload on a schedule queue for resuming execution of the first operations in a future. The workload may comprise data associated with executing a remainder of the first operations. The kernel-mode thread may execute second operations corresponding to a second system call from a second user-mode thread on the processor. Data associated with executing the second operations may be stored on the kernel stack associated with the processor. The second operations may comprise yielding an execution right to the second user-mode thread. In order to yield the execution right to the second user-mode thread, the kernel-mode thread may retrieve thread state information associated with the second user-mode thread from a memory space accessible to the second user-mode thread. The kernel-mode thread may restore registers of the processor with the retrieved thread state information. The kernel-mode thread may return results of the second operations to the second system call.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3A illustrates an example pseudo code for processing a system call.

FIG. 3B illustrates an example pseudo code for implementing a scheduler.

DESCRIPTION OF EXAMPLE EMBODIMENTS

Figure 1:
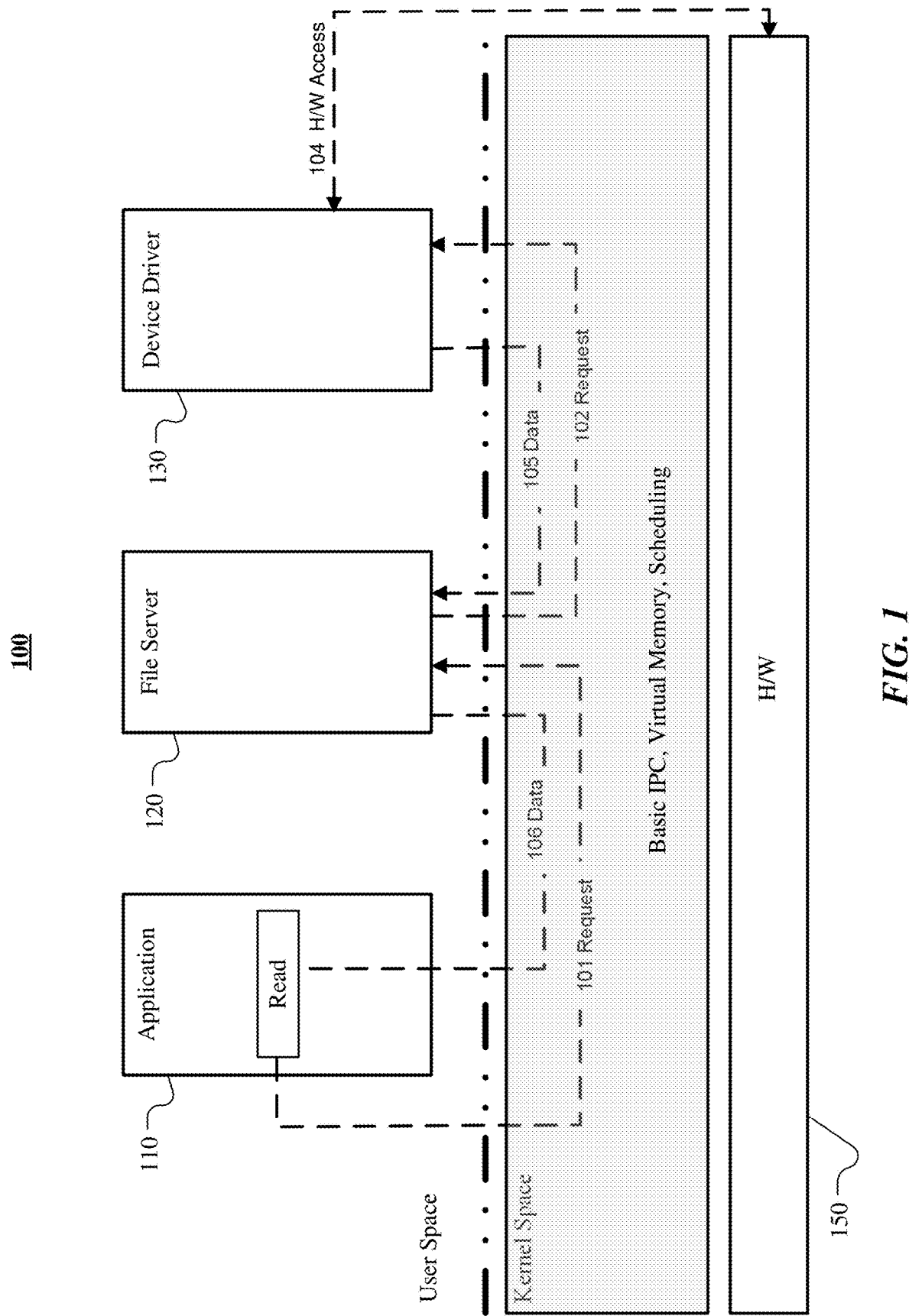
FIG. 1 illustrates an example microkernel-based operation system.

In particular embodiments, a kernel may aim to provide system calls designed to be completed based on events to avoid blocking system calls. A system call may return with the result of the operation without a need to block, or the system call may provide an event identifier which may be used to inform the user-mode thread that the requested operation has been completed through an asynchronous completion mechanism. The only exception may be system calls that wait explicitly for events related to waitable objects. An operating system may need at least one blocking system call in a kernel. A legacy thread management system may allow a user-mode thread to be associated with a kernel stack, where the thread may block inside the kernel, and may resume the execution once an event unblocks the thread. If a pure kernel-mode thread is one-to-one mapped to a user-mode thread, the pure kernel-mode thread may wait for new events like deferred procedure calls and block unless the thread still has work to do. A benefit of having a dedicated kernel stack per kernel thread may be that the kernel can be preemptible. Threads may get preempted at any point in time as long as the preemption has not been explicitly disabled. A major drawback of associating a kernel stack for each user-mode and pure kernel-mode thread may be the memory overhead. The design may impact on cache footprint. Because the kernel stack needs to be switched whenever a scheduler decides to schedule another thread, the accessed stack data for the newly scheduled thread may need to be fetched from memory as opposed to reading the accessed stack data from one of one or more caches.

Most of the system calls in an operating system contemplated in this disclosure may be non-blocking event-based system calls. Thus, a different thread management system may be possible. The operating system may employ a non-preemptible fully event-based kernel that only uses a single stack per processor. Therefore, a thread may not block inside the scheduler. The kernel may not need to swap stacks to schedule another thread. Instead, a thread may be just an execution context defined by a function pointer along with a data pointer. The scheduler may perform a function call to start a new workload on the current stack. Functions that run for a long time must be able to encapsulate their interim work and must be able to resume the interim work from defined points in code. This feature may not work in a legacy monolithic kernel that may have too many execution flows requiring a thread to block, that may execute for a long period of time, and that may need to get preempted to provide responsiveness across the system. The system contemplated in this disclosure may be based on a mirco-kernel, in which most of services may be provided by user-mode service providing threads, not the kernel. Thus, most execution flows inside the kernel may be short lived. Long running execution flows, if any, may be rare exceptions.

User-mode threads may use non-blocking system calls most of the time. Given that the kernel may be non-preemptible, a non-blocking system call may just return back to the user-mode thread after completing the work requested by the system call. Yet, the kernel may need to be able to handle a blocking system call such as waiting for an event, or yielding the processor. Because a user-mode thread may not have a corresponding kernel-mode thread, the kernel may need to be able to return back to user space once the thread got "unblocked." The thread should be able to properly resume execution.

When a user-mode thread makes a system call, the kernel needs to save the callee-saved registers since the callee-saved registers can be clobbered by the kernel system call implementation. A kernel of a particular legacy operating system, which has a corresponding kernel-mode thread per user-mode thread, may save these callee-saved registers on the stack. With the kernel contemplated in the disclosure, each user-mode thread may have an associated kernel thread local storage, which can be used to save the callee-saved registers. The kernel may be able to return back into the user space at a later point by restoring the callee-saved registers and filling the other registers with the results of the called system call. In particular embodiments, the kernel may set the other registers to zero before returning back to user space. To be able to actually block inside the kernel, a system call may need to register with an event that will resume the execution of the system call. When a system call yields the processor to another workload function queued up in the scheduler queue, the system call may need to be requeued in the scheduler queue. Then, the scheduler may schedule other work functions.

During a non-blocking system call, an interrupt that may result in the request to de-schedule the current thread might happen. To schedule another user-mode thread or execute another workload function, a non-blocking system call may need to check whether another workload function needs to be executed. If so, the system call code may need to enqueue the encapsulated interim work into a schedule queue, so that the execution of the system call can be resumed at a later point of time. When the kernel receives an interrupt while executing in user space a first user-mode thread, the interrupt handler may need to decide to which thread the interrupt handler returns after finishing the required interrupt handling. The interrupt handler may either return back to the first user-mode thread and resume the execution of the first user-mode thread or may schedule another queued workload function after preserving the full register information for the first user-mode thread for resuming the execution later. The resumed workload function may correspond to a second user-mode thread, which can be resumed.

To make a system using only a single stack per CPU feasible, the number of blocking operations in the kernel needs to be limited. Otherwise, restoring the state might be too expensive in the long run and might not take advantage of the better stack locality. From a memory point of view, the system contemplated in this disclosure may be beneficial because only one stack per CPU may not require frequent memory swaps while a system with one kernel stack for each thread may experience frequent memory swaps between kernel stacks.

In particular embodiments, an operating system of a computing device may be a microkernel-based operating system. User-mode threads in the operating system may comprise user application threads and service-providing threads. A first service-providing thread may provide a particular service to second threads. A service-providing thread may be a device driver. An application thread may be implemented with an event-driven architecture. The second threads may comprise other service-providing threads or user application threads. A request for the particular service from one of the second threads to the first service-providing thread may be communicated through one of available IPC mechanisms. A result of the particular service from the first service-providing thread to one of the second threads may be communicated through one of the available IPC mechanisms. The computing device may comprise one or more processors. Each processor may be associated with only one kernel-mode thread. The kernel-mode thread may be associated with a kernel stack. A kernel-mode thread of the operating system may store thread state information associated with a first user-mode thread into a memory space accessible to the first user-mode thread when executing in kernel space in response to a first system call by the first-user mode thread. The thread state information associated with the first user-mode thread may be a snapshot of register values associated with the processor when the first user-mode thread calls the first system call. In particular embodiments, the memory space accessible to the first user-mode thread may be a Thread-Local Storage (TLS) associated with the first user-mode thread. In particular embodiments, the memory space accessible to the first user-mode thread may be a Thread Control Block (TCB) associated with the first user-mode thread. The kernel-mode thread may execute first operations corresponding to the first system call on a processor of the computing device. Data associated with executing the first operations may be stored on a kernel stack associated with the processor. The kernel-mode thread may determine to pause the execution of the first operations by calling a scheduler function that makes a schedule decision among a plurality of workloads in the schedule queue based on one or more scheduling policies. The kernel-mode thread may enqueue a workload on a schedule queue for resuming execution of the first operations in a future. The workload may comprise data associated with executing a remainder of the first operations. The kernel-mode thread may execute second operations corresponding to a second system call from a second user-mode thread on the processor. Data associated with executing the second operations may be stored on the kernel stack associated with the processor. The second operations may comprise yielding an execution right to the second user-mode thread. In order to yield the execution right to the second user-mode thread, the kernel-mode thread may retrieve thread state information associated with the second user-mode thread from a memory space accessible to the second user-mode thread. The kernel-mode thread may restore registers of the processor with the retrieved thread state information. The kernel-mode thread may return results of the second operations to the second system call. Although this disclosure describes implementing a kernel with a single kernel stack in a particular manner, this disclosure contemplates implementing a kernel with a single kernel stack in any suitable manner.

In particular embodiments, an operating system of a computing device may be a microkernel-based operating system. User-mode threads in the operating system may comprise user application threads and service-providing threads. A first service-providing thread may provide a particular service to second threads. A service-providing thread may be a device driver. An application thread may be implemented with an event-driven architecture. The second threads may comprise other service-providing threads or user application threads. FIG. 1 illustrates an example microkernel-based operation system 100. As an example and not by way of limitation, illustrated in FIG. 1, an application thread 110 may need to read data from a hardware 150. A file server thread 120 may be a kind of a service-providing thread. The file server thread provides a file access service to a plurality of application threads 110. A device driver thread 130 may be a kind of a service-providing thread. The device driver thread 130 may provide a hardware access service to the file server 120 or any other threads. Although this disclosure describes user-mode threads in a microkernel-based operating system in a particular manner, this disclosure contemplates user-mode threads in a microkernel-based operating system in any suitable manner.

In particular embodiments, a request for the particular service from one of the second threads to the first service-providing thread may be communicated through one of available IPC mechanisms. As an example and not by way of limitation, continuing with a prior example illustrated in FIG. 1, the application thread 110 is trying to read data from a hardware 150. At 101, the application thread 110 may send a request to the file server thread 120 through a one of the available IPC mechanisms. Sending the request through an IPC mechanism may comprise making a system call. Upon receiving the request at 110, the file server thread 120 may check whether the requested data is in a cache. If not, the file server thread 120 may send a request to the device driver thread 130 through one of the IPC mechanism at step 102. Sending the request through an IPC mechanism may comprise making a system call. Though the device driver thread 130 is a user-mode thread, the device driver thread 130 may have a privilege to directly access the hardware 150. At step 130, the device driver thread 130 may send a data read command to the hardware 150. Although this disclosure describes sending a request between user-mode threads through an IPC mechanism in a particular manner, this disclosure contemplates sending a request between user-mode threads through an IPC mechanism in any suitable manner.

In particular embodiments, a result of the particular service from the first service-providing thread to one of the second threads may be communicated through one of the available IPC mechanisms. As an example and not by way of limitation, continuing with a prior example illustrated in FIG. 1, the hardware 150 may transfer requested data to the device driver thread 130 at step 104. Reading data from a requested position in the hardware 150 may be a blocking operation. If the device driver thread 130 requests the data in a non-blocking way, the hardware may issue an interrupt to inform the device driver thread 130 that the data becomes available. The device driver thread 130 may transfer the received data to the file server thread 120 through an IPC mechanism at step 105. Transferring the data through an IPC mechanism may comprise making a system call. The file server thread 120 may transfer the received data to the application thread 110 through an IPC mechanism at step 106. Transferring the data through an IPC mechanism may comprise making a system call. Although this disclosure describes transferring results of a particular service through an IPC mechanism in a particular manner, this disclosure contemplates transferring results of a particular service through an IPC mechanism or shared memory in any suitable manner.

Figure 2:
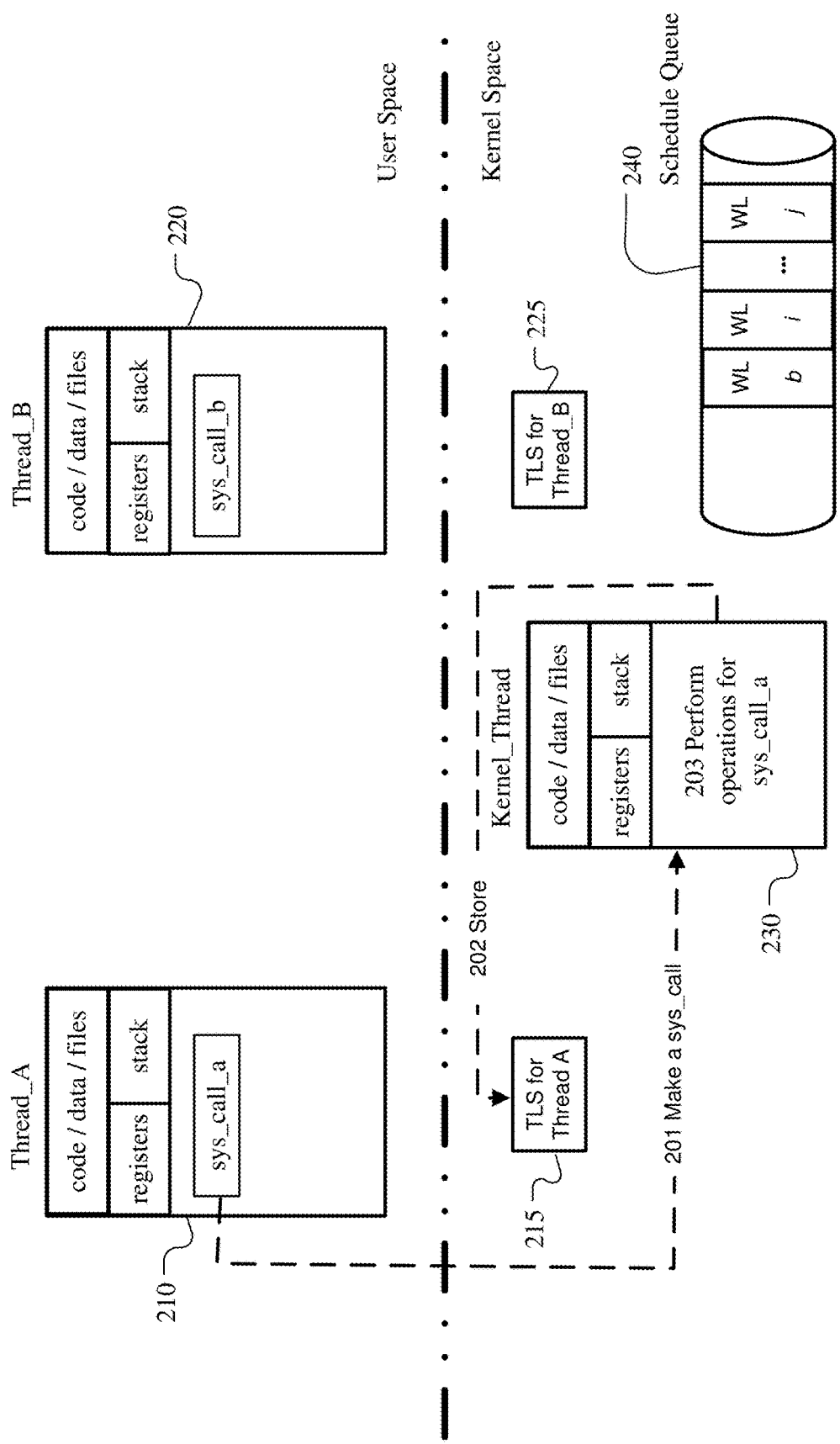
FIG. 2 illustrates an example processing of a system call by a kernel-mode thread.

In particular embodiments, the computing device may comprise one or more processors. Each processor may be associated with only one kernel-mode thread. The kernel-mode thread may be associated with a kernel stack. A processor may be associated with only one kernel stack. FIG. 2 illustrates an example processing of a system call by a kernel-mode thread. As an example and not by way of limitation, illustrated in FIG. 2, a microkernel-based system 200 may have one or more processors. A processor may be a Central Processing Unit (CPU) core. Each processor may be associated with only one kernel-mode thread 230. The kernel-mode thread 230 may be associated with a kernel stack. Thus, each processor may be associated with only one kernel stack. Although this disclosure describes a processor that is associated only with a single kernel-mode thread in a particular manner, this disclosure contemplates a processor that is associated only with a single kernel-mode thread in any suitable manner.

The example illustrated in FIG. 2 may have a situation as follows: A user-mode thread B 220 may have made a system call b. The kernel-mode thread 230 may have performed operations corresponding to the system call b. In the middle of performing the operations corresponding to the system call b, the kernel-mode thread 230 may have decided to pause the operations corresponding to the system call b. In particular embodiments, the kernel-mode thread 230 may pause the operations corresponding to the system call b due to an interrupt. In particular embodiments, the kernel-mode thread 230 may pause the operations corresponding to the system call b due to any suitable reasons. The kernel-mode thread 230 may have enqueued a workload associated with the system call b on a schedule queue 240. The workload may comprise data associated with executing a remainder of the operations corresponding to the system call b in the future. In the example illustrated in FIG. 2, the kernel-mode thread 230 may have retrieved a workload from the schedule queue 240, where the workload may be corresponding to a system call from the user-mode thread A 210. The kernel-mode thread 230 may have finished the operations corresponding to the system call from the user-mode thread A 210. The kernel-mode thread 230 may have returned the results of the operations corresponding to the system call from the user-mode thread A 210. The user-mode thread A 210 may resume its operations.

In particular embodiments, a kernel-mode thread 230 of the operating system may store thread state information associated with a first user-mode thread 210 into a memory space 215 associated with the first user-mode thread 210 in response to a first system call by the first-user mode thread. The thread state information associated with the first user-mode thread 210 may be a snapshot of register values associated with the processor when the first user-mode thread 210 makes the first system call. In particular embodiments, the memory space 215 associated with the first user-mode thread may be a Thread-Local Storage (TLS) associated with the first user-mode thread. In particular embodiments, the memory space 215 associated with the first user-mode thread may be a Thread Control Block (TCB) associated with the first user-mode thread. As an example and not by way of limitation, continuing with a prior example illustrated in FIG. 2, the user-mode thread A 210 makes a system call a at step 201. Upon receiving the system call a, the kernel-mode thread 230 may, at step 202, store callee_saved registers to a memory space 215 that is associated with the user-mode thread A 210. The callee_saved registers may be a snapshot of register values for the corresponding processor when the user-mode thread A 210 makes the system call a. Those register values need to be restored when the user-mode thread A 210 resumes the execution when the system call a is returned. In particular embodiments, the kernel-mode thread 230 may store any other thread state information associated with the user-mode thread A 210. A kernel in a particular legacy operating system having a kernel stack per user-mode thread may store the callee_saved registers into a kernel stack corresponding to the user-mode thread A 210. But, the kernel-mode thread 230 disclosed in this application may store the callee_saved registers to a memory space 215 associated with the user-mode thread A 210. In particular embodiments, the memory space 215 may be a TLS associated with the user-mode thread A 210. In particular embodiments, the memory space 215 may be a TCB associated with the user-mode thread A 210. By doing this, the kernel-mode thread 230 may be able to avoid keeping a kernel stack per user-mode thread. Although this disclosure describes storing thread state information associated with a user-mode thread into a memory space accessible to the user-mode thread in a particular manner, this disclosure contemplates storing thread state information associated with a user-mode thread into a memory space accessible to the user-mode thread in any suitable manner.

In particular embodiments, the kernel-mode thread 230 may execute first operations corresponding to the first system call on a processor of the computing device. Data associated with executing the first operations may be stored on a kernel stack associated with the processor. As an example and not by way of limitation, continuing with a prior example illustrated in FIG. 2, the kernel-mode thread 230 may determine which set of operations needs to be performed based on a type of the system call a. A set of parameters for performing the set of operations may also depend on the parameters of the system call a. At step 203, the kernel-mode thread 230 may perform one or more operations corresponding to the system call a. Although this disclosure describes executing operations corresponding to a system call in a particular manner, this disclosure contemplates executing operations corresponding to a system call in any suitable manner.

In particular embodiments, the kernel-mode thread 230 may determine to pause the execution of the first operations by calling a scheduler function that makes a schedule decision among a plurality of workloads in the schedule queue 240 based on one or more scheduling policies. FIG. 3A illustrates an example pseudo code for processing a system call. As an example and not by way of limitation, illustrated in FIG. 3A, in order to execute operations corresponding to a system call, the kernel-mode thread 230 may call a workload function x with a set of parameters, where x, the exact workload function, may depend on a type of the system call, and where the set of parameters may depend on the parameters of the system call. The workload function x may be structured as a loop where an operation is executed at each iteration. At the end of each operation, the kernel-mode thread 230 may call sched_need_resched in order to determine whether to pause the execution of the operations. Although this disclosure describes determining whether to pause the execution of the operations corresponding to a system call in a particular manner, this disclosure contemplates determining whether to pause the execution of the operations corresponding to a system call in any suitable manner.

In particular embodiments, the kernel-mode thread 230 may enqueue a workload on a schedule queue 240 for resuming execution of the first operations in a future. The workload may comprise data associated with executing a remainder of the first operations. After the workload is enqueued to the schedule queue 240, no information associated with the first operations may remain in the kernel stack. Thus, the data may be structured to store all the information that needs to be preserved. The data may also comprise a link to the memory space 215 associated with the user-mode thread 210. When the first operations complete after being resumed, the kernel may restore the callee-saved registers from the memory space 215 associated with the user-mode thread 210 and resume the user-mode thread 210.

In a particular legacy operating system having a kernel stack per user-mode thread, the data associated with executing the remainder of the first operations may be stored in the kernel stack. The operating system contemplated in this disclosure may avoid a necessity of having a kernel stack per user-mode thread by queuing the data associated with executing the remainder of the operations into the schedule queue 240. As an example and not by way of limitation, continuing with a prior example illustrated in FIG. 3A, if sched_need_resched function returns TRUE, the kernel-mode thread 230 may enqueue a workload on a schedule queue 240. The workload may comprise data associated with executing a remainder of the operations. In the example illustrated in FIG. 3A, the data may comprise a link to the workload function x and unprocessed parameters. The data may also comprise results of the executed operations so far. Although this disclosure describes enqueuing data associated with executing a remainder of the operations in a particular manner, this disclosure contemplates enqueuing data associated with executing a remainder of the operations in any suitable manner.

In particular embodiments, the kernel-mode thread 230 may determining a workload to execute among a plurality of workloads in the schedule queue 240. The workload may be associated with second operations corresponding to a second system call from a second user-mode thread 220 to execute on the processor. After the kernel-mode thread 230 enqueue the workload associated with the first operations corresponding to the first system call, the kernel-mode thread 230 may choose a workload associated with second operations among a plurality of workloads in the schedule queue 240. FIG. 3B illustrates an example pseudo code for implementing a scheduler. As an example and not by way of limitation, illustrated in FIG. 3B, the kernel-mode thread 230 may choose a workload among the plurality of workloads in the schedule queue 240 by calling get_work_item_for_current_cpu. The function get_work_item_for_current_cpu may make a scheduling decision among the plurality of workloads in the schedule queue 240 based on one or more scheduling policies. Examples of scheduling policies may comprise, but not limited to, fair queuing, first come first served, round robin, shortest job first, and multilevel feedback queues. Then, the kernel-mode thread 240 may call work_item→func(work_item→data), which may be equivalent to a call to workload function x with parameters, to execute operations associated with the selected workload. Although this disclosure describes determining a workload to execute among a plurality of workloads in the schedule queue in a particular manner, this disclosure contemplates determining a workload to execute among a plurality of workloads in the schedule queue in any suitable manner.

Figure 4:
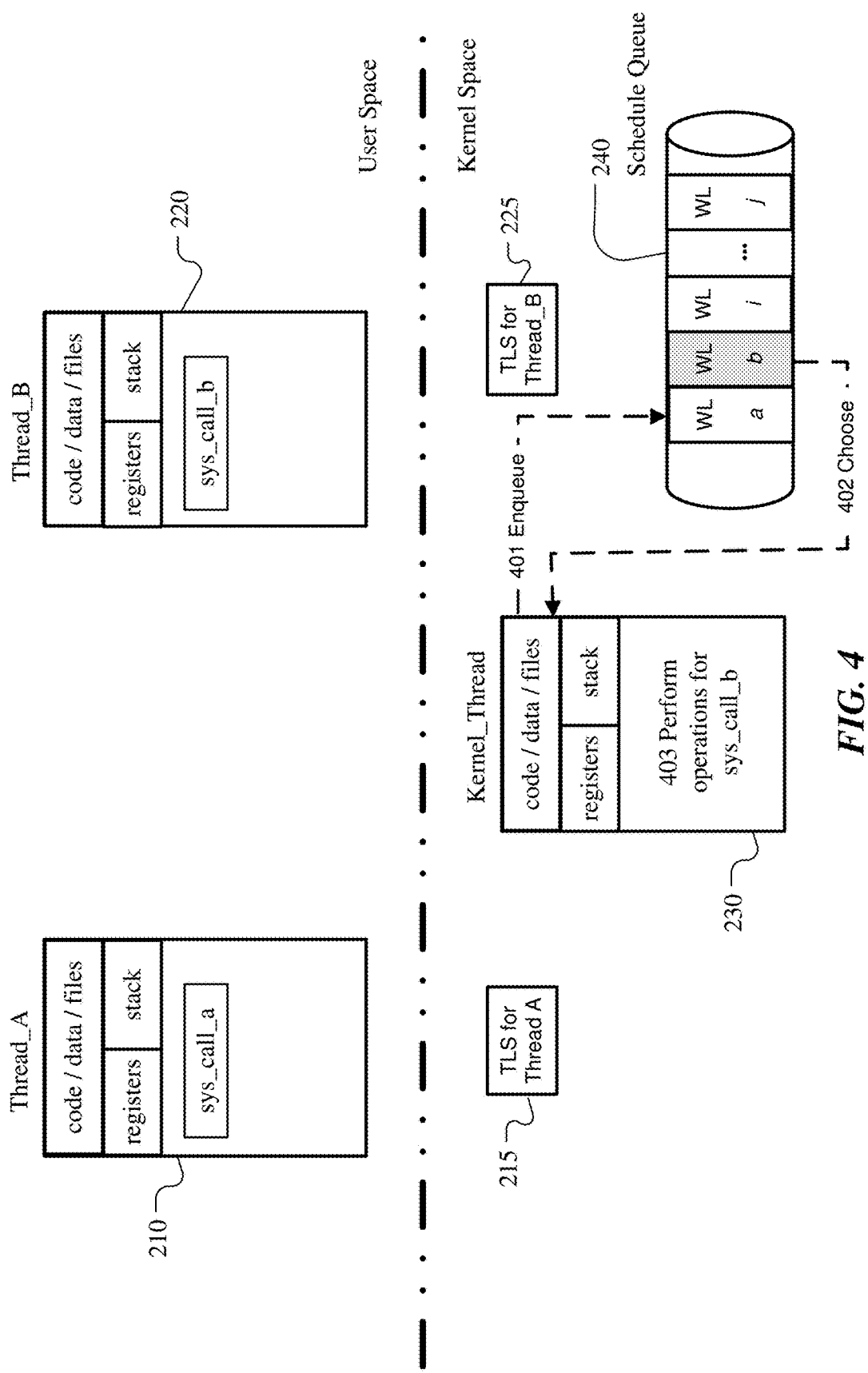
FIG. 4 illustrates an example switching between workloads for system calls.

In particular embodiments, the kernel-mode thread 230 may execute second operations corresponding to the second system call from the second user-mode thread 220 on the processor. Data associated with executing the second operations may be stored on the kernel stack associated with the processor. FIG. 4 illustrates an example switching between workloads for system calls. The example illustrated in FIG. 4 is a continuation of the example illustrated in FIG. 2. As an example and not by way of limitation, illustrated in FIG. 4, the kernel-mode thread 230 may enqueue the workload associated with operations corresponding to the system call a at step 401. At step 402, the kernel-mode thread 230 may choose the workload associated with operations corresponding to the system call b among the plurality of workloads in the schedule queue 240 based on one or more scheduling policies. The kernel-mode thread 230 may load data associated with the chosen workload to the kernel stack associated with the processor. At step 403, the kernel-mode thread 230 may execute the operations corresponding to the system call b from the user-mode thread B 220. Although this disclosure describes executing operations corresponding to a system call in a particular manner, this disclosure contemplates executing operations corresponding to a system call in any suitable manner.

In particular embodiments, the second operations may comprise yielding an execution right to the second user-mode thread 220. In order to yield the execution right to the second user-mode thread 220, the kernel-mode thread 230 may retrieve thread state information associated with the second user-mode thread 220 from a memory space 225 associated with the second user-mode thread 220. The kernel-mode thread 230 may return results of the second operations to the second system call. The kernel-mode thread 230 may restore registers of the processor with the retrieved thread state information. As an example and not by way of limitation, continuing with a prior example illustrated in FIG. 4, the kernel-mode thread 230 may need to return the results of the operations to the system call b and yield the execution right to the user-mode thread B 220 at the end of processing the system call b. The kernel-mode thread 230 may retrieve callee_saved registers from the memory space 225 associated with the user-mode thread B 220. In particular embodiments, the memory space 225 may be a TLS associated with the user-mode thread B 220. In particular embodiments, the memory space 225 may be a TCB associated with the user-mode thread B 220. The kernel-mode thread 230 may return results of the operations to the system call b. Then, the kernel-mode thread 230 may yield the execution right to the user-mode thread B 220 by restoring registers of the processor with the callee_saved registers retrieved from the memory space 225 associated with the user-mode thread B 220. Although this disclosure describes returning results to a system call in a particular manner, this disclosure contemplates returning results to a system call in any suitable manner.

Figure 5:
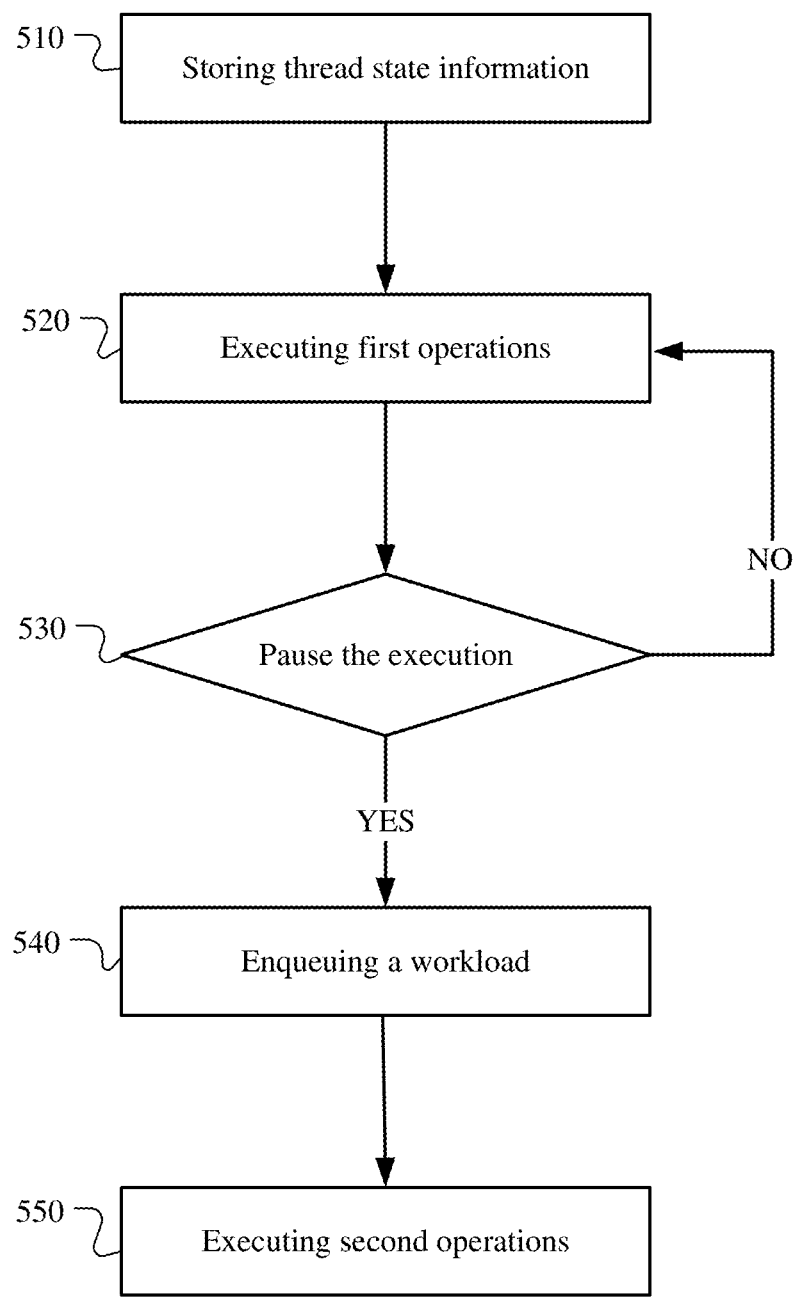
FIG. 5 illustrates an example method for executing system calls with a single kernel stack.

FIG. 5 illustrates an example method 500 for executing system calls with a single kernel stack. The method may begin at step 510, where a kernel-mode thread may store thread state information associated with a first user-mode thread into a memory space accessible to the first user-mode thread in response to a first system call by the first-user mode thread. At step 520, the kernel-mode thread may execute first operations corresponding to the first system call on a processor of the computing device. Data associated with executing the first operations may be stored on a kernel stack associated with the processor. At step 530, the kernel-mode thread may determine to pause the execution of the first operations. At step 540, the kernel-mode thread may enqueue a workload on a schedule queue for resuming execution of the first operations in a future. The workload may comprise data associated with executing a remainder of the first operations. At step 550, the kernel-mode thread may execute second operations corresponding to a second system call from a second user-mode thread on the processor. Data associated with executing the second operations may be stored temporarily on the kernel stack associated with the processor. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for executing system calls with a single kernel stack including the particular steps of the method of FIG. 5, this disclosure contemplates any suitable method for executing system calls with a single kernel stack including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
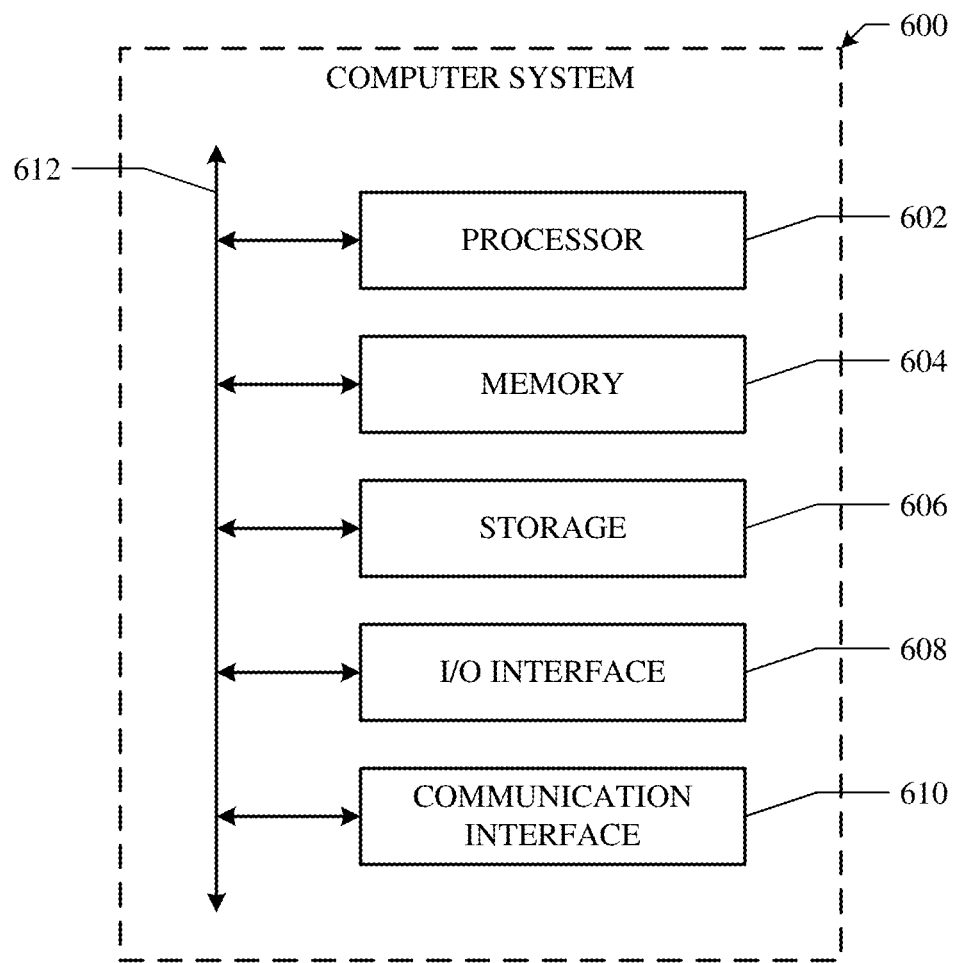
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, flash cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a kernel-mode thread of an operating system of a computing device:
   storing, in response to a first system call by a first-user mode thread, thread state information associated with the first user-mode thread into a memory space associated with the first user-mode thread when executing in kernel space;
   executing, on a processor of the computing device, first operations corresponding to the first system call, wherein data associated with executing the first operations are stored on a kernel stack associated with the processor;
   determining to pause the execution of the first operations;
   enqueuing a workload on a schedule queue for resuming the execution of the first operations in a future, wherein the workload comprises data associated with executing a remainder of the first operations; and
   executing, on the processor, second operations corresponding to a second system call from a second user-mode thread, wherein data associated with executing the second operations are stored on the kernel stack associated with the processor.

2. The method of claim 1, wherein the thread state information associated with the first user-mode thread is a snapshot of register values associated with the processor when the first user-mode thread makes the first system call.

3. The method of claim 1, wherein the processor is associated with only one kernel-mode thread.

4. The method of claim 1, wherein the memory space associated with the first user-mode thread is a Thread-Local Storage (TLS) associated with the first user-mode thread.

5. The method of claim 1, wherein the memory space associated with the first user-mode thread is a Thread Control Block (TCB) associated with the first user-mode thread.

6. The method of claim 1, wherein determining to pause the execution of the first operations comprises calling a scheduler function, wherein the scheduler function makes a schedule decision among a plurality of workloads in the schedule queue.

7. The method of claim 6, wherein the schedule decision is made based on one or more scheduling policies.

8. The method of claim 1, wherein the second operations comprise returning to the second user-mode thread.

9. The method of claim 8, wherein returning to the second user-mode thread comprises:
   retrieving thread state information associated with the second user-mode thread from a memory space associated with the second user-mode thread;
   returning results of the second operations to the second system call; and
   restoring registers of the processor with the retrieved thread state information.

10. The method of claim 1, wherein the operating system is a microkernel-based operating system, wherein user-mode threads in the operating system comprise user application threads and service-providing threads.

11. The method of claim 10, wherein a first service-providing thread provides a particular service to second threads, wherein the second threads comprise other service-providing threads or user application threads.

12. The method of claim 11, wherein a request for the particular service from one of the second threads to the first service-providing thread is communicated through one of available Inter-Process Communication (IPC) mechanisms.

13. The method of claim 11, wherein a result of the particular service from the first service-providing thread to one of the second threads is communicated through one of available IPC mechanisms or a shared memory.

14. The method of claim 10, wherein the service-providing threads comprise device drivers.

15. The method of claim 10, wherein the user application threads are implemented with an event-driven architecture.

16. One or more computer-readable non-transitory storage media embodying software that is operable by a kernel-mode thread of an operating system of a computing device when executed to:
  store, in response to a first system call by a first user-mode thread, thread state information associated with the first user-mode thread into a memory space associated with the first user-mode thread when executing in kernel space;
  execute, on a processor of the computing device, first operations corresponding to the first system call, wherein data associated with executing the first operations are stored on a kernel stack associated with the processor;
  determine to pause the execution of the first operations;
  enqueue a workload on a schedule queue for resuming the execution of the first operations in a future, wherein the workload comprises data associated with executing a remainder of the first operations; and
  execute, on the processor, second operations corresponding to a second system call from a second user-mode thread, wherein data associated with executing the second operations are stored on the kernel stack associated with the processor.

17. The media of claim 16, wherein the thread state information associated with the first user-mode thread is a snapshot of register values associated with the processor when the first user-mode thread makes the first system call.

18. The media of claim 16, wherein the processor is associated with only one kernel-mode thread.

19. The media of claim 16, wherein the memory space associated with the first user-mode thread is a Thread-Local Storage (TLS) associated with the first user-mode thread.

20. A system comprising:
  one or more processors; and
  one or more computer-readable non-transitory storage media coupled to one or more of the processors and comprising instructions operable when executed by one of the processors to cause a kernel-mode thread of an operating system of the system to:
    store, in response to a first system call by a first user-mode thread, thread state information associated with the first user-mode thread into a memory space associated with the first user-mode thread when executing in kernel space;
    execute, on a processor among the one or more processors, first operations corresponding to the first system call, wherein data associated with executing the first operations are stored on a kernel stack associated with the processor;
    determine to pause the execution of the first operations;
    enqueue a workload on a schedule queue for resuming the execution of the first operations in a future, wherein the workload comprises data associated with executing a remainder of the first operations; and
    execute, on the processor, second operations corresponding to a second system call from a second user-mode thread, wherein data associated with executing the second operations are stored on the kernel stack associated with the processor.

* * * * *